May 7, 1963 O. H. WILLIFORD 3,089,001

TELEPHONE RINGING CIRCUIT

Filed Dec. 28, 1959

INVENTOR
O. H. WILLIFORD

BY

R. C. Winter
ATTORNEY

3,089,001
TELEPHONE RINGING CIRCUIT

Oscar H. Williford, Bronxville, N.Y., assignor to Bell Telephone Laboratories, Incorporated, New York, N.Y., a corporation of New York Filed Dec. 28, 1959, Ser. No. 862,186
9 Claims. (Cl. 179—84)

Figure 1:
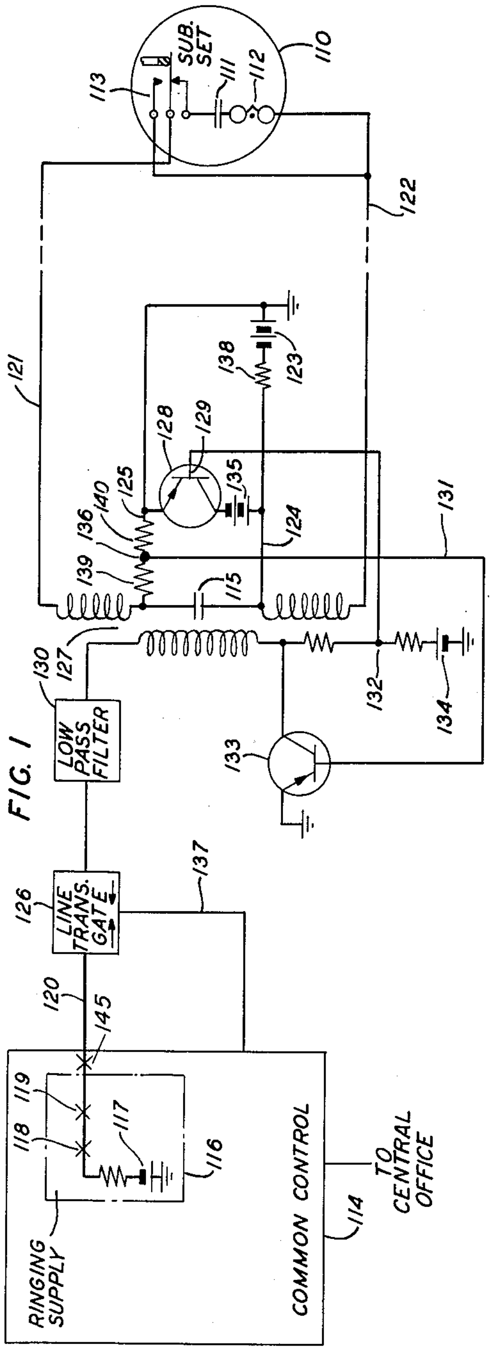

This invention relates in general to telephone switching and transmission systems, and more particularly, to ringing equipment in such systems.

In recently developed electronic telephone systems the ringing techniques have, of necessity, departed from the operation familiar to the art as employed in former systems, and instead, a form of ringing generally referred to as tone ringing has been utilized. This departure is due primarily to the power handling limitations present in electronic telephone systems.

Other ringing schemes, as known in the art, generally make use of a bell with an electrically operated clapper as the signal responsive device. In order to operate such a bell, a low frequency, high voltage alternating-current signal is applied to the line circuit; e.g., a 20 cycle, 90 volt rms ringing signal. With the advent of electronic telephone systems, however, the use of solid state devices in the transmission paths has prevented the use of low frequency, high voltage ringing signals. This is because the above-mentioned devices are generally limited in their power handling capacities. However, as these devices are not limited in their frequency transmission characteristics, the low power handling limitation may be circumvented by having the central office generate a plurality of tones of different signaling frequencies which may be detected by specially designed telephones. The resultant ringing is in the form of audible tone indications that are produced by an electro-acoustical transducer responsive to an amplified signal of the selected frequency. It is obvious that such tone ringing systems, though adequate, would require expensive substitutions of major components in telephone ringing systems presently in service.

It is a general object of this invention, therefore, to improve electronic telephone system operation. More specifically, it is an object of this invention to improve the ringing operation in an electronic telephone system.

It is another object of this invention to provide a simple and economical signaling circuit for electronic telephone systems.

It is still another object of this invention to provide ringing in an electronic telephone system utilizing telephone station equipment presently in service in other types of telephone systems.

In accordance with the present invention, these and other objects are realized in one specific illustrative embodiment wherein a switching device, alternately conductive and nonconductive during ringing to a small amount of energy transmitted from a control common to a plurality of subscriber lines, is placed in each telephone line circuit. This switching device serves to regulate the condition of the telephone subset capacitor thereby controlling activation of the subset ringer.

The subscriber station, with the capacitor and ringer in series, as is normally provided, is connected to the line talking battery through the secondary winding of the line transformer. The switching device is bridged across the line, and operates in response to signals delivered during ringing intervals through the primary winding of the line transformer, to control the charging and discharging of the subset capacitor through the coil of the subset bell and thereby develop an audible ringing signal. There is thus obviated, by this connection, the necessity of providing the usual high voltage, alternating-current, ringing signal which in this instance would not be capable of passing through the low power transmission elements of the electronic switching system. Instead, only a small amount of energy, which is readily transmitted through the solid state components of the electronic system, is needed to operate the switching device. The switching device, in turn, controls the conventional telephone ringer components to accomplish the ringing operation.

The small amount of energy needed to operate the switch is provided by a low voltage ringing supply circuit that is located in the telephone office common control. This ringing supply circuit consists of a potential source and interrupters operating so as to provide a low power, intermittent voltage that delivers to the transistor switch unidirectional current pulses that, in turn, sequentially enable and disable the switch.

With the switch disabled, the line talking battery transmits a charging current to the subset capacitor, which current flows through the series ringer so as to audibly clap one bell. On the other hand, when the switch is enabled, a circuit is completed which allows the charge established on the subset capacitor to reverse through the series ringer so as to audibly clap the opposite bell. Thus the novel ringing operation is achieved with perfect freedom in the choice of components in the transmission and switching circuits through which the ringing control signals are transmitted.

The line circuit further includes means for disconnecting the ringing supply by providing a control path to ground when the telephone is answered.

In accordance with one aspect of the invention, the switching device and the ringing disconnect means each comprise transistors, and a distinct potential source is connected in series with the transistor switch to afford bias in the ringing path for more rapid and distinct operation.

In accordance with another aspect of the invention, the ringing disconnect means may comprise an electromechanical relay in which case particular contacts on the relay may be utilized to provide certain supervisory control operations.

It is a feature of this invention that a telephone ringing circuit includes means which permits employment of telephone stations including low frequency alternating-current ringers in an electronic telephone system.

It is another feature of this invention that telephone stations be alerted by means of standard ringing control signals which are selectively applied through a direct-current connection to the line transformer primary winding to switching means in the telephone line circuit.

It is still another feature of this invention that the line circuit switching means selectively establish a circuit including the telephone station capacitor and ringer so as to charge and discharge the capacitor through the ringer under command of the ringing control signals.

It is a feature in accordance with one aspect of this invention that the line circuit comprises an electro-mechanical relay having contacts which selectively connect the ringing and supervisory control leads to ground under control of the line circuit.

It is a feature in accordance with another aspect of this invention that a bias voltage source be connected in series with the line circuit switching means.

Figure 2:
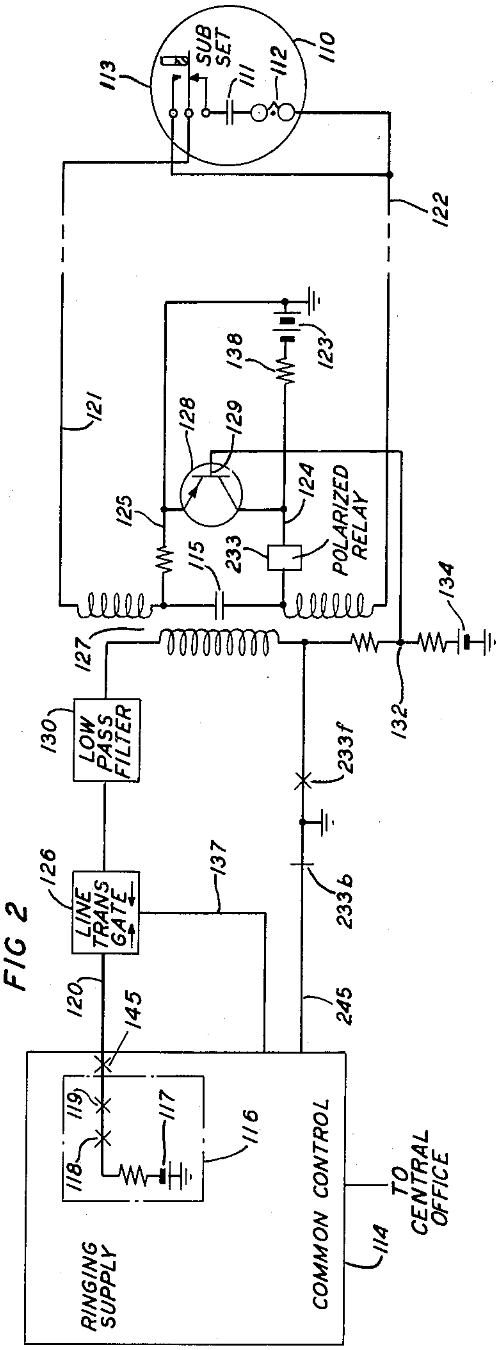

A complete understanding of these and other objects and features of my invention may be gained from consideration of the following detailed description, together with the accompanying drawing, in which:

FIG. 1 is a schematic representation of a line circuit and common control equipment in an electronic telephone switching system in accordance with one specific illustrative embodiment of my invention; and FIG. 2 is a schematic representation in accordance with another specific illustrative embodiment of my invention including additional supervisory control equipment.

Turning now to the drawing, FIG. 1 shows a remote subscriber station 110 comprising capacitor 111, series ringer 112, and switchhook contacts 113 with normally open and normally closed sets of contacts. The line circuit associated with station 110 comprises the tip lead 121 and the ring lead 122 connected respectively to ground and negative talking battery 123 through distinct secondary windings on line transformer 127. When the substation is in the ON hook or idle condition, the normally closed switchook contacts 113 are in the closed position illustrated. This condition establishes a direct-current path through leads 124, 125, the secondaries of line transformer 127, and the tip and ring leads, 121 and 122, respectively, which allows the talking battery 123 to establish a charge of one polarity, which may advantageously be 45 volts, on the subset capacitor 111 through the above-described line loop. This charge is established and maintained on capacitor 111 as long as the switch, illustrated as transistor 128, is in the OFF or high impedance condition. The transistor 128 is maintained in the cut-off condition by the bias potential established on base lead 129 by potential source 134 which is poled positive with respect to ground and may, in this specific embodiment, be 1.5 volts. A second transistor 133 is also maintained in the cut-off condition by applying ground potential to its base on base lead 131, the emitter being grounded. This insures that the primary winding on the central office side of line transformer 127 is not grounded, the purpose of which will be made clear shortly hereafter.

The ringing supply 116 in accordance with operating instructions from the central office, and under command of common control 114, has a ringing cycle which comprises an active interval, during which a ringing signal is provided, followed by a silent interval, during which the ringing signal is blocked. In this illustrative embodiment, a twenty cycle per second ringing cycle is employed with a two second ringing interval followed by a four second silent interval. The ringing signal advantageously is provided by the potential source 117 which is poled negative with respect to ground and may, in this specific embodiment, be 3 volts, and the desired ringing and silent intervals are provided by the interrupters 118 and 119, respectively, as is known in the art. Thus the output of ringing supply 116 is a pulse train consisting of 2 second duration groups of 40 unidirectional current signals spaced by a 4 second duration in which no pulses are produced.

In this specific embodiment of the invention, a time division switching arrangement of the type disclosed, for example, in a patent 2,936,338 to D. B. James and J. D. Johannesen, issued May 10, 1960, is contemplated in which pairs of active telephone stations are physically connected over a single common communication link 120 in a cyclically recurring short interval of time. Such action is effected by properly timed operation of line transmission gates such as gate 126 assigned to the station 110. These gates advantageously may comprise any of a variety of components known in the art for obtaining either extremely high or low impedance in the signal transmission path. One example of such a gate structure is contained in the aforementioned James-Johannesen patent application.

Thus the actual ringing of subscriber station 110 necessarily occurs in accordance with the basic time division principle wherein each active subscriber station is assigned a frequently recurring discrete interval of time referred to as a time slot. These time slots are obtained as a result of operating each transmission gate of the numerous stations served by the common transmission link at a rate of approximately 8,000 times per second in order to assure that the information transmitted is of proper fidelity. As there are numerous channels or subscriber stations present, the time between the first and the succeeding operation of one particular subscriber station transmission gate is subdivided in time into as many parts as there are channels. Thus during the entire ringing cycle afforded by ringing supply 116, the line gate 126 is enabled over lead 137 by common control 114 in a cyclically recurring time slot, during which time slot interrupter 145 is similarly enabled. In essence, the line transmission gate 126 and element 145 also interrupt the twenty cycle voltage delivered by ringing potential 117, but they do so at such a high rate that the voltage transmitted to transistor 128 is adequate to forward-bias that transistor into conduction in the desired time intervals. The operation of line transmission gates at such a high rate further precludes the possibility of utilizing a conventional high power ringing signal in a time division communication system.

The ringing of subscriber station 110 may best be illustrated by considering the operation that occurs when the ringing supply 116, including interrupter 118 which controls the ringing rate and interrupter 119 which controls the active and silent interval, initiates a ringing action during the time slot interval assigned to the called party. First the interrupters 118 and 119 are closed to provide an active interval which connects the ringing source 117 through the series circuit including common transmission bus 120, line transmission gate 126, low pass filter 130, and the primary of the line transformer 127 to potential source 134. This connection provides a path for current to flow through the resistors in series between the primary of transformer 127 and potential source 134 and thus establishes at junction 132 a negative potential, which potential is available at base electrode 129 of transistor 128 to forward-bias that transistor and cause it to conduct. The conduction of transistor 128 bridges a circuit across line leads 124 and 125 so as to place potential source 135 across capacitor 111 in the telephone station 110. The source 135 may also advantageously constitute a 45 volt potential which is poled in opposition to the polarity of the charge already established on capacitor 111; accordingly, a change of 90 volts is effected across this capacitor. The current resulting from the voltage change across capacitor 111 is dissipated in the ringer coil of series ringer 112 thereby causing an audible clap of one of the ringer bells.

Upon the opening of interrupter 118, with interrupter 119 still in a closed condition during this initial ringing operation, the ringing voltage 117 is removed from the common transmission bus 127, and junction 132 returns to the normal positive potential established by source 134. Thus transistor 128 is once more back-biased so as to remove the bridge circuit across leads 124 and 125.

When the path through transistor 128 is blocked, the line potential source 123 is connected across subset capacitor 111 thereby subjecting it to a 90 volt change in the opposite direction. Again the charging current associated with subset capacitor 111 activates the ringer 112 so as to audibly clap the opposite bell. The above-mentioned operation, following the command of the interrupter 118, repeats itself 20 times per second during the two second ringing interval and does not occur at all during the four second silent interval that interrupter 119 is in an open condition.

During the intermittent operation of switching transistor 128 the potential established at junction 136 is momentarily altered. This alteration, appearing on base lead 131 of transistor 133, is of insufficient duration to affect conduction through the transistor. However, when the subscriber station goes off-hook, a constant negative potential is produced at junction 136 and transistor 133 is forward-biased into conduction.

The negative potential at 136 is brought about by the opening of switchhook contacts 113 from their normally closed position against the lower contact shown connected to capacitor 111 which removes the subset capacitor 111 and the series ringer 112 from the circuit.

At the same time that the ringer is removed from the circuit, the normally open set of switchhook contacts, which represent the subset talking circuits, are closed to establish a talking path through subset 110. This talking path is defined by the line loop including battery 123, resistor 138, lead 124, the lower winding of line transformer 127, lead 122, the subset 110, lead 121, the upper winding of transformer 127, resistors 139 and 140, and lead 125 to ground. Thus establishment of the talking path forward-biases transistor 133 by producing a negative potential at point 136 and transistor 133 conducts. As a result of the conduction of transistor 133, ringing control signals transmitted from ringing supply 116 will be shorted to ground. This condition further provides a ground for the primary winding of line transformer 127 which is necessary to allow speech transmission to exist when common control 114 completes the speech path over the common transmission bus 120.

Another specific embodiment of my invention is shown in FIG. 2 wherein the transistor 133 has been replaced by relay 233. Certain of the elements of FIG. 2 are counterparts of elements in the circuit of FIG. 1; where there is a correspondence, the elements are similarly designated.

The ringing operation proceeds in the manner previously explained in connection with FIG. 1 with the exception that the potential source 135 in series with the switching transistor 128 in FIG. 1 has been removed, and in the circuit of FIG. 2 the talking battery 123 is increased by an amount sufficient to effect the necessary voltage change across the subset capacitor 111 so as to audibly clap the ringer bell upon intermittent operations of switching transistor 128.

The role of relay 233 may best be illustrated by the following operation. When switching transistor 128 conducts, the ensuing short circuit across battery 123 completes a path which allows the subset capacitor 111 to discharge through ringer 112 and through the operating winding of relay 233. The relay 233 is polarized such that it does not operate at this time. Upon the following opening of interrupter 118 or interrupter 119 the ringing control signal is prevented from reaching junction 132, potential source 134 back-biases transistor 128 and the short circuit across battery 123 is removed. Under this condition current from talking potential source 123 flows through the line circuit and ringer 112 in the opposite direction of the discharge current, to establish a charge on capacitor 111. As the duration of the charging operation is relatively short, there occurs, at this time, only a momentary operation of relay 233. The continued current flow through the talking path when the called telephone 110 is answered, on the other hand, is in the same direction as the direction of the charging current for capacitor 111 and thus holds relay 233 in the operative condition thereby closing the front contact **233*f* and opening the back contact 233*b*. This condition provides a path to ground for any further ringing control signals transmitted throught the common transmission bus 120. Thus the desired ground connection for the primary coil of line transformer 127** to allow speech transmission to proceed is provided.

An added advantage of relay 233 is that supervisory control lead 245 may be connected from the back contact **233*b* through to common control 114** so as to provide a method for ascertaining the on-hook or off-hook condition of the subscriber station from the common control.

It is to be understood that the above-described arrangements are illustrative of the application of the principles of this invention. Numerous other arrangements may be devised by those skilled in the art without departing from the spirit and scope of this invention.

What is claimed is:

1. A telephone ringing circuit comprising a ringer and capacitor connected in series in a subscriber station, a line circuit comprising a pair of wires connected across said series circuit, a line voltage source connected to said capacitor through said pair of wires, said line circuit including a switching transistor having input and output electrodes connected across said wires and in a parallel circuit with said ringer and capacitor, a bias source poled to maintain said transistor normally nonconducting, ringing control means for supplying unidirectional current pulses to activate said transistor, and means including a telephone transmission channel and transmission gate means operable for connecting said ringing control means to said bias source whereby said transistor controls the charging and discharging of said capacitor through said ringer thereby causing said ringer to produce an audible signal.

2. A telephone ringing system comprising a subscriber station including switchhook contacts and a capacitor and a ringer in series, a line transformer, a line voltage source, a line circuit including the secondary of said line transformer and a pair of wires connected between said capacitor and said line voltage source to establish a normal charge on said capacitor, a switching transistor having its emitter and collector electrodes connected in said line circuit in shunt with said line voltage source and operable to control the charging and discharging of said capacitor through said ringer, a source of unidirectional current ringing pulses, a telephone transmission line connecting said ringing pulse source to one terminal of the primary winding of said line transformer, said telephone transmission line including transmission gate means operable for applying ringing pulses from said ringing pulse source to said one terminal of said primary winding, and means for connecting the other terminal of said primary winding to the base electrode of said switching transistor, said last-mentioned means being effective to establish a direct-current path for said ringing pulses to operate said switching transistor.

3. A telephone ringing circuit in accordance with claim 2 and further comprising switch means connected to said other terminal of the primary of said transformer and operable for shunting signals from said ringing pulse source to ground, and means connected in said line circuit for operating said switch means upon closure of said switchhook contacts.

4. A telephone ringing system comprising in combination a subscriber station including a capacitor and ringer in series, a telephone transmission channel, a line circuit including a line transformer, a line voltage source connected over a pair of wires to said capacitor for determining a charge on said capacitor, a source of unidirectional current control pulses, a normally nonconductive transistor connected in said line circuit having input and output electrodes connected across said pair of wires and in parallel with said series connected capacitor and ringer, means for applying unidirectional current pulses from said ringing control pulse source to a control electrode of said transistor through a path including said transmission channel and one winding of said line transformer, said transistor being rendered conductive upon receipt of each of said current pulses at said control electrode for alternately discharging and charging said capacitor through said ringer to produce an audible signal, switch means connected to said line circuit for shunting said ringing control pulses to ground when said line circuit is in a talking condition, and means for operating said switch means on establishment of a talking condition in said line circuit, said transmission channel being available for transmission of speech signals when said switch means is in an operated condition.

5. A telephone system in accordance with claim 4 wherein said operating means comprises a relay having a winding connected in said line circuit and having a first contact connected between said signaling source and ground and a second contact operative when said relay operates for indicating the condition of said line circuit.

6. In a telephone system, a combination comprising a subscriber station including a capacitor and ringer in series, a line circuit including a line transformer, a transistor connected in said line circuit and maintained in a normally nonconductive condition by a bias source direct-current connected to its control lead, a telephone transmission line, a ringing supply means including a source of potential of greater magnitude and poled in opposition to said bias source, means for intermittently connecting said ringing supply to said switching transistor including said telephone transmission line and one winding of said line transformer for effecting an intermittently conductive and nonconductive state in said transistor, a line voltage source connected in shunt with said switching transistor and responsive to the conductive and nonconductive states of said transistor for producing a ringing current through said capacitor and ringer in series.

7. In a telephone system, a combination in accordance with claim 6 and further comprising a second line voltage source connected in series with said transistor and poled in opposition to the normal charge on said capacitor.

8. A telephone ringing system comprising a line circuit including a line voltage source, a line transformer, and a switching transistor having emitter, base, and collector electrodes, a subscriber station remote from said line circuit and having a capacitor and ringer in series, a source of unidirectional current ringing control pulses, means including a telephone transmission channel and transmission gate means selectively operable for connecting said ringing pulse source to one winding of said line transformer, means connecting the emitter and collector leads of said transistor in said line circuit in shunt with said line voltage source, and means connecting the base lead of said transistor to said one winding of said line transformer to complete a path for said ringing control pulses, said switching transistor being responsive to said ringing control signals for controlling the charging and discharging of said capacitor by said line voltage source through said bell whereby an audible signal is produced.

9. In a telephone system the combination comprising a subscriber station including switchhook contacts and a capacitor and ringer in series, a line circuit including a transformer, a potential source, a pair of wires connecting said source to said subscriber capacitor, and a switching transistor connected in parallel with said potential source for shunting said potential source from said pair of wires, a source of ringing signals including a first potential source poled negative with respect to ground, a second lesser potential source poled positive with respect to ground and connected between a first terminal of one winding of said transformer and ground, a telephone transmission gate, a terminal, means for selectively connecting said first potential source and a second terminal of said one transformer winding through said transmission gate for producing unidirectional current control pulses at said terminal, said switching transistor having a control electrode direct-current connected to said terminal for establishing said transistor in a conductive condition for the duration of each control pulse, and input and output electrodes on said transistor effectively connected in a series circuit with said switchhook contacts and capacitor and ringer for causing said ringer to emit an audible signal, and a second transistor having its input and output electrodes connected between said second terminal of said transformer winding and ground for shunting said control signals to ground upon activation of said switchhook contacts.

References Cited in the file of this patent

UNITED STATES PATENTS

| | | |
|---|---|---|
| 2,180,334 | Bredehoft | Nov. 21, 1939 |
| 2,761,909 | Wallace | Sept. 4, 1956 |
| 2,823,266 | Trousdale | Feb. 11, 1958 |
| 2,824,175 | Meacham | Feb. 18, 1958 |
| 2,957,950 | Holman et al. | Oct. 25, 1960 |
| 2,967,911 | Flowers et al. | Jan. 10, 1961 |

FOREIGN PATENTS

| | | |
|---|---|---|
| 219,603 | Australia | Jan. 9, 1959 |